(12) United States Patent
Serlie

(10) Patent No.: US 9,886,780 B2
(45) Date of Patent: Feb. 6, 2018

(54) VOLUME VISUALIZATION

(75) Inventor: Iwo Willem Oscar Serlie, Best (NL)

(73) Assignee: Koninklijke Philips N.V., Eindhoven (NL)

(*) Notice: Subject to any disclaimer, the term of this patent is extended or adjusted under 35 U.S.C. 154(b) by 757 days.

(21) Appl. No.: 13/880,858

(22) PCT Filed: Oct. 14, 2011

(86) PCT No.: PCT/IB2011/054552
§ 371 (c)(1),
(2), (4) Date: Sep. 11, 2013

(87) PCT Pub. No.: WO2012/056354
PCT Pub. Date: May 3, 2012

(65) Prior Publication Data
US 2014/0003691 A1    Jan. 2, 2014

(30) Foreign Application Priority Data
Oct. 25, 2010  (EP) ..................................... 10188724

(51) Int. Cl.
| | | |
|---|---|---|
| *G06T 7/00* | (2017.01) | |
| *G06T 11/00* | (2006.01) | |
| *G06T 15/08* | (2011.01) | |

(52) U.S. Cl.
CPC ............ *G06T 11/003* (2013.01); *G06T 15/08* (2013.01)

(58) Field of Classification Search
CPC .................................................. G06T 7/0012
See application file for complete search history.

(56) References Cited

U.S. PATENT DOCUMENTS

| | | |
|---|---|---|
| 5,150,421 A | 9/1992 | Morishita et al. |
| 6,526,162 B2 | 2/2003 | Asano et al. |
| 6,771,262 B2 * | 8/2004 | Krishnan ...................... 345/424 |
| 7,006,591 B2 | 2/2006 | Machida |

(Continued)

FOREIGN PATENT DOCUMENTS

| | | |
|---|---|---|
| JP | H02213327 A | 8/1990 |
| JP | 2001351093 A | 12/2001 |
| JP | 2003091735 A | 3/2003 |

OTHER PUBLICATIONS

Ehricke et al: "Visualization of Vasculature From Volume Data"; Computers & Graphics, vol. 18, No. 3, May 1994, pp. 395-406.

(Continued)

*Primary Examiner* — Kim Vu
*Assistant Examiner* — Molly Delaney

(57) ABSTRACT

A volume visualization, i.e volume rendering, system comprising a feature detector for detecting a feature like a border between body and air (e.g. skin) in an image volume dataset. A distance computing subsystem is arranged for computing a distance from the feature, e.g. a border, a boundary or skin to an image element of the image volume dataset. A weighting subsystem is arranged for weighting an image element value of the image element, based on the distance, to obtain a weighted image element value. A view generator is arranged for generating a view of the image volume dataset, based on the weighted image element value, wherein a view element value of the view is based on the weighted image element value. The view comprises a two-dimensional image view, and the view element value comprises a pixel value.

13 Claims, 4 Drawing Sheets

(56) References Cited

U.S. PATENT DOCUMENTS

| | | | |
|---|---|---|---|
| 7,529,396 B2 | 5/2009 | Matsumoto | |
| 7,532,748 B2 | 5/2009 | Lara-Montalvo et al. | |
| 7,933,438 B2 | 4/2011 | Haque et al. | |
| 8,477,135 B2 | 7/2013 | Thiele | |
| 8,577,115 B2 | 11/2013 | Gering et al. | |
| 2003/0156747 A1* | 8/2003 | Faber | 382/128 |
| 2005/0105786 A1* | 5/2005 | Moreau-Gobard et al. | 382/128 |
| 2005/0134582 A1 | 6/2005 | Claus et al. | |
| 2007/0237379 A1* | 10/2007 | Haque et al. | 382/130 |
| 2008/0030500 A1* | 2/2008 | Krishnan et al. | 345/424 |
| 2009/0290778 A1* | 11/2009 | Sun et al. | 382/131 |
| 2010/0053159 A1 | 3/2010 | Visser | |
| 2012/0075638 A1* | 3/2012 | Rollins et al. | 356/479 |
| 2013/0181976 A1* | 7/2013 | Dastmalchi et al. | 345/419 |

OTHER PUBLICATIONS

Olstad et al: "3D Transvaginal Ultrasound Imaging for Identification of Endometrial Abnormality"; SPIE vol. 2432, 1995, pp. 543-553.

Udupa et al: "Relative Fuzzy Connectedness and Object Definition: Theory, Algorithms, and Applications in Image Segmentation"; IEEE Transactions on Pattern Analysis and Machine Intelligence, vol. 24, No. 11, Nov. 2002, pp. 1485-1500.

Viola et al: "Importance-Driven Feature Enhancement in Volume Visualization"; IEEE Transactions on Visualization and Computer Graphics, vol. 11, No. 4, Jul./Aug. 2005, pp. 408-418.

Wang et al: "Stereo CT Image Compositing Methods for Lung Nodule Detection and Characterization"; Academic Radiology, vol. 12, No. 12, Dec. 2005, pp. 1512-1520.

Zuiderveld et al: "Techniques for Speeding up High-Quality Perspective Maximum Intensity Projection"; Pattern Recognition Letters 15, (1994), pp. 507-517.

\* cited by examiner

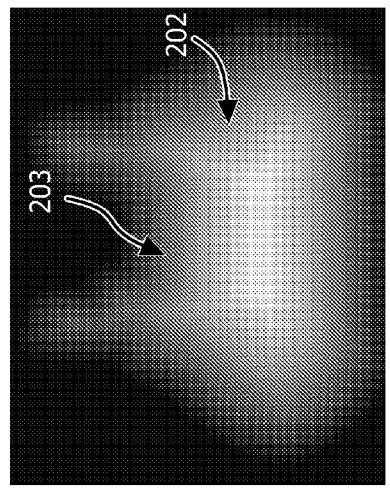
FIG. 2A
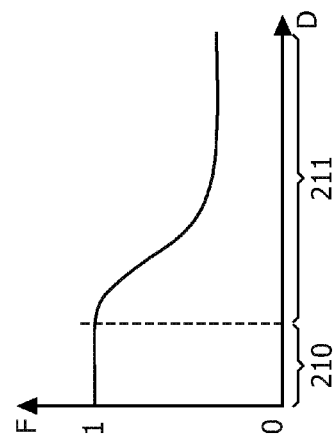
FIG. 2B
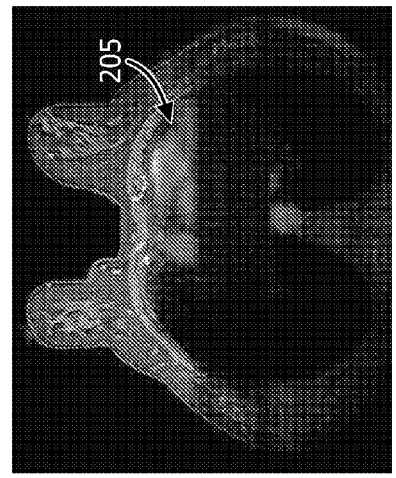
FIG. 2C
FIG. 2D

VOLUME VISUALIZATION

FIELD OF THE INVENTION

The invention relates to volume visualization. The invention also relates to generating a two-dimensional view of an image volume dataset.

BACKGROUND OF THE INVENTION

From a user point of view, volume visualization allows the user to quickly inspect the volumetric image dataset and to select a region of interest to the user, such as a radiologist. The algorithms like combined intensity projection (CIP), maximum intensity projection (MIP), closest vessel projection (CVP), average intensity projection (AIP), and volume intensity projection (VIP) are based on ray casting. For each pixel of the displayed image, a ray is cast from said pixel through the image data volume. The intensity of a pixel is computed based on the intensities of voxels along the cast ray. For MIP, the intensity of the pixel is the intensity of a voxel along the cast ray having the highest intensity. For CVP, the intensity of the pixel is the intensity of a first voxel along the cast ray having a maximum intensity, possibly a local maximum intensity, greater than a CVP threshold. For AIP, the intensity of the pixel is the average of intensities of voxels along the cast ray. However, the information comprised in these images does not take into account the location of pixels along the cast ray.

In volume intensity projection (VIP), intensities of voxels along a ray cast from a pixel are transformed based on multiplied by weight factors. The larger the distance from a voxel to said pixel, the smaller the weight factor is. The voxels with weighted intensities are then used to compute an image, using e.g. MIP.

US 2010/0053159 A1 discloses a system for CIP rendering an image based on a volumetric image dataset, the system comprising: a computation unit for computing an initial pixel intensity of a pixel of the image, defined by a corresponding voxel intensity of a corresponding voxel comprised in the volumetric image dataset; and an adjustment unit for computing a final pixel intensity of the pixel, based on the initial pixel intensity and on a location of the corresponding voxel. Unlike a system using the volume intensity projection technique, which involves adjusting intensities of voxels comprised in an image dataset, the system of the cited application is arranged to adjust intensities of pixels. In particular, the final pixel intensity depends on a distance from the corresponding voxel to a viewing plane.

SUMMARY OF THE INVENTION

It would be advantageous to have an improved volume visualization. To address this concern, a first aspect of the invention provides a system comprising:

a feature detector for detecting a feature in an image volume dataset;

a distance computing subsystem for computing a distance from the feature to an image element of the image volume dataset;

a weighting subsystem for weighting an image element value of the image element, based on the distance, to obtain a weighted image element value;

a view generator for generating a view of the image volume dataset, based on the weighted image element value, wherein a view element value of the view is based on the weighted image element value.

This technique can be used to enhance the view of structures that are expected at a known location in respect of the feature. Because the image element value is weighted based on the distance of the image element to a feature in the image, the view is adapted to emphasize a certain region or regions and/or attenuate another region or regions in dependence on the distance to the feature. Consequently, the emphasized regions are visualized in greater detail than other regions of the image. Also, the view is less obscured by image detail, which may be present in the attenuated regions. The view may comprise a two-dimensional view, in which case the view element value comprises a pixel value. The view may comprise a projection. It will be appreciated that the view element value may be based on two or more weighted image element values, which may be interpolated to obtain a more accurate view element value.

The feature may comprise at least part of a border of an object represented by the image volume dataset. This way, the region close to the border may be enhanced (or attenuated), whereas the regions further away from the border may be attenuated (or enhanced). For example, the central part of the interior of the object may be attenuated, and the part close to the outside of the object may be enhanced. This way, image structure of the part of the object close to the outside of the object is not obscured by image structure of the central interior of the object.

The border may comprise a border between a body and air, wherein the body may comprise a human or animal body. Accordingly, the object may comprise a representation of at least part of a human or animal body. The weighting may be based on a distance from the skin. The system may thus be configured to enhance structures close to the skin, or to enhance structures deep in the body. The system may also be configured to attenuate structures close to the skin, or to attenuate structures deep in the body.

The weighting subsystem may be arranged for enhancing an image element located close to the skin and/or attenuating an image element located in a central portion of the body. For example, when examining vascular structures close to the skin, the image might be obscured by the heart and the aorta and the great vessels. In such a case, the system may be configured to enhance the structures close to the skin and/or attenuate the structures deep inside the body. This may be the case, for example, in breast MR imaging.

The distance computing subsystem may be arranged for computing the distance in respect of an image element inside the object. This way the visualization of an interior of the object is weighted based on the distance from an outside boundary of the object. Optionally, the outside of the object is processed differently. For example, the outside of the object may be cut away e.g. by setting the image element values of image elements located outside the object to zero. Alternatively, these image element values may be left unchanged or weighted with a small weight. It is also possible to weight these image element values based on the distance to the detected feature.

The weighting subsystem may be arranged for computing the weight according to a transfer function associating a weight with a distance. This allows configuring the weights in a flexible way.

The weighting subsystem may be arranged for using a first transfer function for image elements on a first side of the feature, and a different second transfer function for image elements on a second side of the feature opposite to the first side.

The view generator may be arranged for generating a combined intensity projection, a maximum intensity projection, an average intensity projection, or a closest vessel projection of a volume comprising weighted image element values. These weighted image element values may have been weighted as set forth.

The view generator may be arranged for evaluating a single value of any image element. This is a situation for which the system is highly suitable, because the weights are applied to the single value and the single value is visualized. This way, local image structure is highlighted by weighting the single value. Such a value is for example a gray level or intensity value. The single value of a plurality of (neighboring) image elements may be combined, for example by interpolation.

The view generator may be arranged for processing image elements located on a ray cast from a pixel to determine the pixel value, and the corresponding image element may be located substantially on the ray cast from the pixel. This provides a useful view of the image volume dataset with weighted image element values.

In another aspect, the invention provides an image acquisition apparatus comprising the system set forth. For example, the image acquisition apparatus comprises an image scanner and a viewing console, wherein the system set forth is applied to an image obtained by the image scanner and the resulting view generated by the system set forth is displayed on the viewing console.

In another aspect, the invention provides a workstation comprising the system set forth.

In another aspect, the invention provides a volume visualization method, comprising:

detecting a feature in an image volume dataset;

computing a distance from the feature to an image element of the image volume dataset;

weighting an image element value of the image element, based on the distance, to obtain a weighted image element value; and generating a two-dimensional view of the image volume dataset, based on the weighted image element value.

In another aspect, the invention provides a computer program product comprising instructions for causing a processor system to perform the method set forth.

It will be appreciated by those skilled in the art that two or more of the above-mentioned embodiments, implementations, and/or aspects of the invention may be combined in any way deemed useful. Likewise, it will be appreciated that the invention applies to any kind of volume image data, including three-dimensional, four-dimensional, or higher-dimensional image data, data resulting from any medical imaging modality such as computed tomography, magnetic resonance imaging, positron-emission tomography, and ultrasound acquisitions. For example, a weighting could be based on a temporal dimension. Moreover, the output view is not limited to a two-dimensional output image, but may be a higher-dimensional or lower-dimensional output image.

Modifications and variations of the image acquisition apparatus, the workstation, the system, and/or the computer program product, which correspond to the described modifications and variations of the system, can be carried out by a person skilled in the art on the basis of the present description.

BRIEF DESCRIPTION OF THE DRAWINGS

These and other aspects of the invention are apparent from and will be elucidated with reference to the embodiments described hereinafter. In the drawings:

FIG. 2A shows a slice of a dynamic contrast-enhanced MRI dataset;

FIG. 2B shows a representation of a distance transform;

FIG. 2C shows a slice of an MRI dataset after weakening;

FIG. 2D shows a weakening function;

DETAILED DESCRIPTION OF EMBODIMENTS

The MIP is a widespread visualization technique, in part due to its simplicity. MIP projects maximum intensity values along rays intersecting an image volume onto a plane of projection.

Figure 1A:
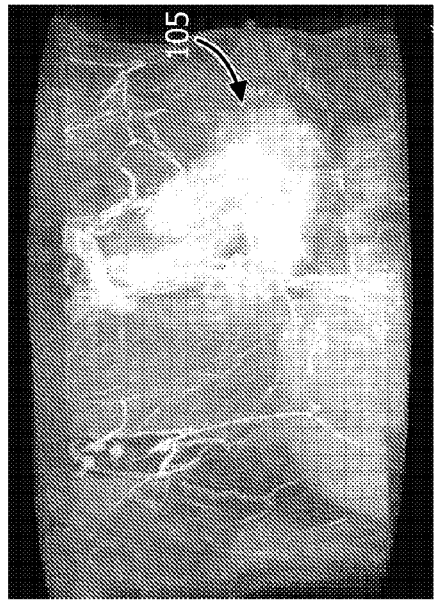
FIG. 1A shows a slice of a dynamic contrast-enhanced MRI dataset.
Figure 1B:
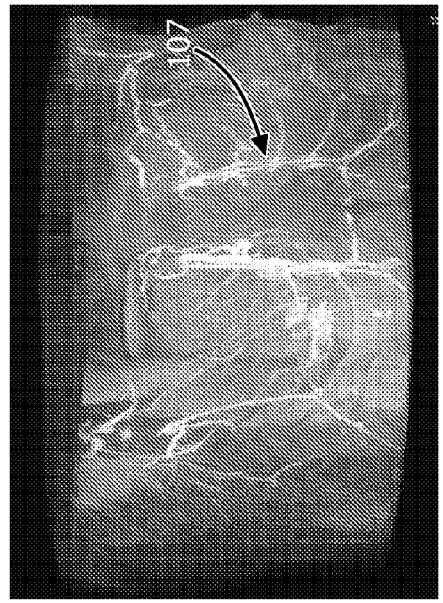
FIG. 1B shows a MIP of the MRI dataset.
Figure 1C:
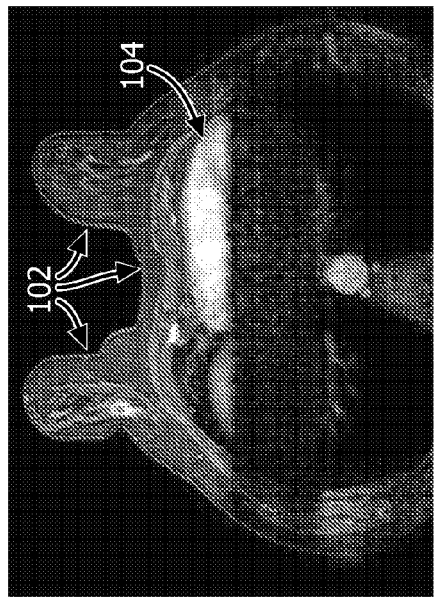
FIG. 1C shows a result of z-weakening.
Figure 1D:
FIG. 1D shows a result of z-weakening in dependence on a distance transform.

FIG. 1A shows an axial slice from a dynamic-contrast-enhanced (DCE) MRI dataset and FIG. 1B shows a traditional anterior-posterior MIP view of the MRI dataset. Clearly, the heart 104,105 is a dominant bright structure that overlaps with the clinically relevant breast tissue 102 in the MIP. This makes the MIP inadequate for viewing this type of dynamic contrast-enhanced MRI. FIG. 1C shows the result of a z-weakening to improve the MIP, using a method described in US 2010/0053159 A1. This technique improves the rendering of overlapping structures such as vessels against a bright background that all have approximately identical intensity values. The visualization of the heart 106 is weakened. FIG. 1D shows a result of a MIP image made after a weakening of voxel values based on a distance transform, as described in this application. In FIG. 1D, vessel structure 107, which overlaps the heart, is visible, which vessel structure is not well-depicted in FIGS. 1A and 1B.

Weakening gray-values in clinically significant areas may result in a loss of the relationship between a contrast-enhanced voxel value and the displayed values. Clearly visible in FIG. 1C is that several bright vessels with identical intensity in the volume get a different intensity on the screen. In the existing methods which use voxel value weakening, the amount of weakening is dependent on the orientation of projection with respect to the volume. Hence, rotating the view causes the intensity of an image structure in the MIP to change, which may have an undesirable effect.

To obtain the view shown in FIG. 1D, a weakening of the signal was applied based on a distance transform. The weakened signal was computed before computing a maximum intensity along the projection ray. The amount of weakening may be defined by a weakening function which maps a distance to a weakening factor. This weakening function may be a non-linear, user-defined function. In the example of FIG. 1D, the amount of weakening is not based on the viewing direction, but is based on a distance transform. For the breast MR example shown in FIG. 1, the distance transform was defined to be the distance of a voxel to the skin of the patient. The weakening function may be chosen such that all relevant structures within a certain distance from the skin are clearly visible, and structures deeper within the body (farthest away from the skin) are weakened.

A bright structure that should be weakened can be close to a structure that should not be weakened. The distance transform allows a precise definition of the clinically relevant structures and their amplification or weakening. When using contrast-enhanced vessel projections, vessels are expected to be the brightest structures. With this method, the relationship between data values and displayed values is maintained in areas that matter. This contributes to the confidence in the rendering technique. Voxel-values do not change as a function of the orientation of the MIP. Hence, rotating the MIP does not cause voxel-values and corresponding pixel values to change and significant structures to be displayed are maintained, which is desirable.

For specific applications, such as axilla, conventional MIPs are hampered by irrelevant bright structures obscuring the structures of interest. For example, for breast MRI data, the heart is a very dominant structure that hinders inspection of vessels inside and close to the breast and axilla. MIP cannot always provide the insight in the structures that matter using 3D.

FIG. 2A shows a slice from a dynamic-contrast-enhanced (DCE) MRI dataset similar to the one of FIG. 1A, with the heart 204 showing as a dominant bright structure. From this image, a distance map was derived in which each image element is labeled with the shortest distance to any of the pixels at the skin. A visual representation of a slice of the distance map is shown in FIG. 2B, wherein white color 202 denotes a large distance to the skin, and dark color 203 denotes a smaller distance to the skin or to outside of the body. FIG. 2C shows the slice displayed in FIG. 2A, after weakening based on the distance transform shown in FIG. 2B. An example of a weakening function F is shown as a function of the distance transform D in FIG. 2D.

Figure 3:
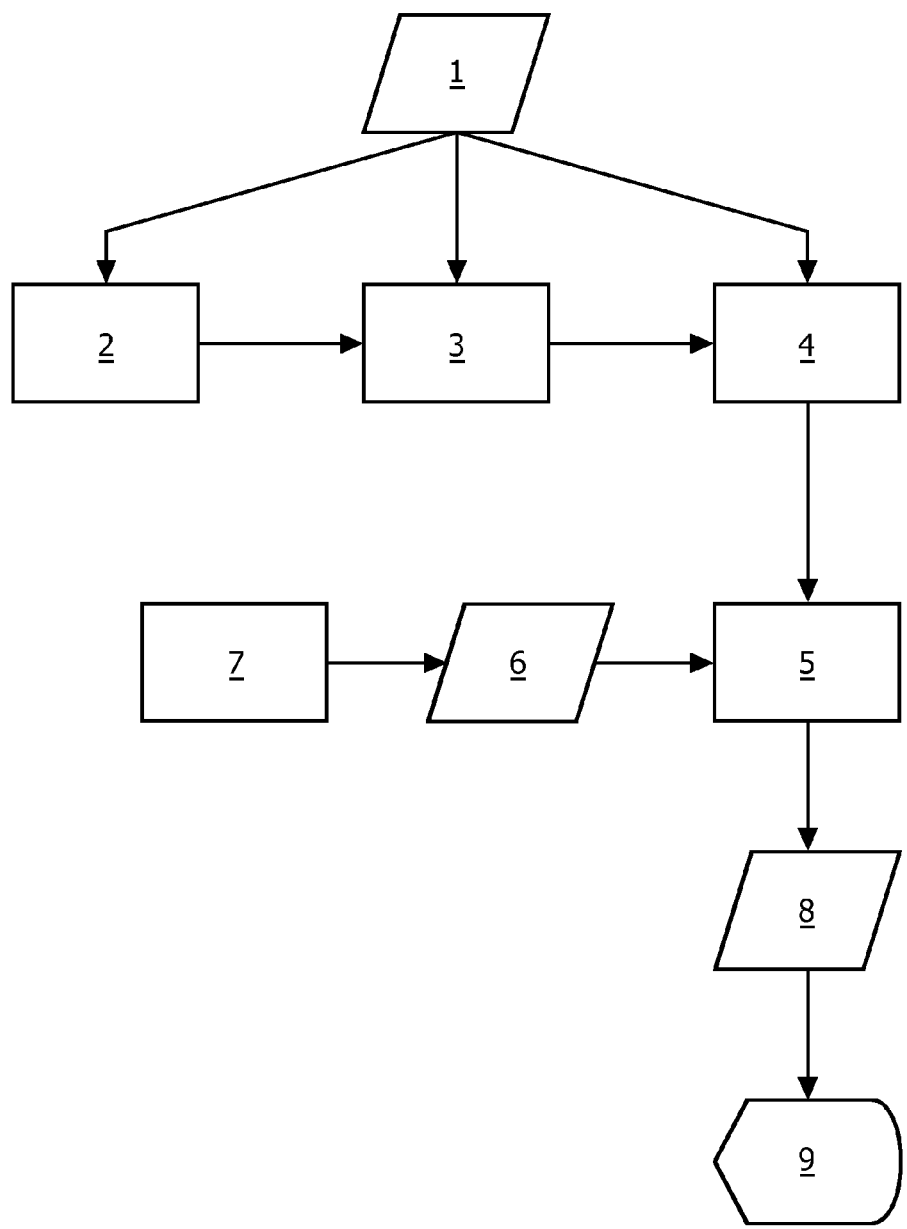
FIG. 3 is a block diagram of a volume visualization system.

FIG. 3 illustrates a volume visualization system. Such a system may comprise a display 9, user input device 7, and data storage means (not shown) such as magnetic disk or random access memory, for storing inter alia a image volume dataset 1 and/or a view 8. The system may further comprise one or more processors for executing a computer program which may also be stored on the data storage means. The system may have a communications port for receiving and/or transmitting data, e.g. from and to a server. The features described herein may be implemented partly or completely in form of computer instructions which may be executed by the one or more processors.

The system may be arranged for storing at least part of an image volume dataset 1 in the data storage means. The system may be able to obtain the image volume dataset 1 from any possible source, including a removable storage media, a server accessible through a communications system, or a built-in image acquisition apparatus. The image volume dataset 1 comprises image elements; each image element may represent a property of a small portion of a space represented by the image volume dataset. The system may include an image scanner, known in the art per se, for generating the image volume dataset.

The system may comprise a feature detector 2 arranged for detecting a feature in an image volume dataset 1. Such a feature may comprise any image feature, in particular an image structure such as an edge or an object, or at least part of a border of an object. The detector may include an implementation of any feature detection algorithm, known in the art per se, to perform the detection of the feature. The location of the feature is used by the distance computing subsytsem 3. Since the feature may span a plurality of image elements, the feature detector 2 may, for example, provide as output a list of image elements which are part of the feature.

The system may further comprise a distance computing subsystem 3 for computing a distance from the feature to an image element of the image volume dataset 1. The distance computing subsystem 3 may be arranged for computing the distance to the feature for a plurality of image elements, for example substantially all the image elements of the image volume dataset 1, or substantially all image elements in a subvolume of the image volume dataset 1. Alternatively, the distance may be computed for e.g. a regularly spaced subset of image elements in the image volume dataset or subvolume. The distance may be a shortest distance from the image element to the feature, meaning a distance to a point of the feature which is closest to the image element. For example, in case the output of the feature detector comprises a list of image elements, the distance computing subsystem may be arranged for computing the distance from the image element of the feature which is closest to the image element under consideration.

The system may comprise a weighting subsystem 4 for weighting an image element value of the image element, based on the distance, to obtain a weighted image element value. The weighting may cause an increase or a decrease of the image element value, which depends on the distance. For example, a weighting factor may be selected based on the distance, and multiplied by the image element value to obtain the weighted image element value. An example weighting factor is one divided by the distance. When the latter weighting factor is used as a multiplication factor, the image element values are decreased more for image element values which are farther away from the feature. Similar to the distance computing subsystem 3, the weighting subsystem 4 may be arranged to compute a weighting for all or a subset of the image elements.

The system may comprise a view generator 5 for generating a view 8 of the image volume dataset 1, based on the weighted image element value, in which a view element value of the view 8 is based on the weighted image element value. It is possible that the distance computing subsystem 3 and the weighting subsystem 4 have processed a plurality of image elements, or all of the image elements, so that an at least partially weighted image volume dataset is obtained. The view generator 5 may be arranged for generating a view of such (at least partially) weighted image volume dataset. Since a view comprises another image, a view element value may be understood as a value of an image element of the view. Such a value may be an intensity value or a gray value. The view generator may be arranged for casting a ray from a view element through the volume, and evaluate weighted image element values of image elements along the ray. Such a view element may be assigned a view element value based on those weighted image element values. For example, the largest such weighted image element value may be assigned to the view element value, to obtain a MIP of the weighted image element values. The view may be a two-dimensional image view, in which case the view elements are pixels and the view element values are pixel values.

In a particular example, the feature which is detected by the feature detector may comprise at least part of a border between a body and air, i.e., the skin. This way, the distance computing subsystem computes the distance from an image element to the skin of a body. The aforementioned distance computing subsystem may be arranged to compute the shortest distance to the feature, in this case the skin. The weighting subsystem 4 may be arranged for enhancing an image element located close to the skin and/or attenuating an image element located in a central portion of the body, based on the computed distances.

The distance computing subsystem 3 may be arranged for computing the distance from the border of the object to an image element inside the object. This is also the case when the object is a body. The system may be arranged for ignoring any image elements outside the object. The opposite is also possible, in which case only image elements outside the object are considered.

The system according to claim 1, wherein the weighting subsystem 4 is arranged for computing the weight according to a transfer function associating a weight with a distance. Such a transfer function may comprise a linear or a non-linear function. FIG. 2D shows an example of a transfer function. This example shows a constant portion 210 where the value is 1, for image elements close to the feature, and portion 211 in which the value gradually declines to a lower, fixed value. This can be used to decrease image element values of image elements that are farther away from the feature.

The weighting subsystem 4 may be arranged for using a first transfer function for image elements on a first side of the feature, and a different second transfer function for image elements on a second side of the feature opposite the first side. This arrangement may be used in particular where the image volume dataset can be divided into two sides of the feature, which is the case where the feature is the border of an object such as a body. In the latter case, the image is divided into a portion inside the object and a portion outside the object. These portions may be weighted differently. For example, either of the portions may be set to 0 to remove the portion entirely from view.

The view generator 5 may be arranged for generating a combined intensity projection, a maximum intensity projection, an average intensity projection, or a closest vessel projection of a volume comprising weighted image element values. The view generator 5 may be arranged for receiving view parameters 6, which may be controlled by a user through user interface element 7. View parameters 6 may include any of viewing direction, magnification, and a desired type of projection.

The view generator 5 may be arranged for evaluating a single value of any image element. For example, the system may be arranged for processing single-channel datasets, i.e., a grayscale image rather than a color image. However, the system may also be arranged for processing color images. In the latter case, the weighting may be applied to a plurality of color channels for each applicable image element, and a projection technique suitable for color image volume datasets, known in the art per se, may be used to generate a view of the weighted color image volume dataset.

Figure 4:
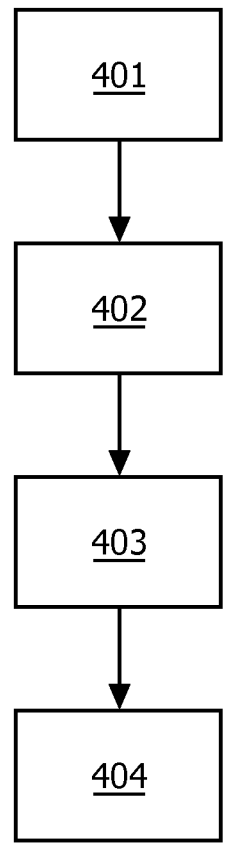
FIG. 4 is a flowchart of a method of volume visualization.

FIG. 4 shows a flowchart of a volume visualization method. The method comprises step 401 of detecting a feature in an image volume dataset, step 402 of computing a distance from the feature to an image element of the image volume dataset, step 403 of weighting an image element value of the image element based on the distance, to obtain a weighted image element value, and/or step 404 of generating a two-dimensional view of the image volume dataset, based on the weighted image element value. Variations of the method may be implemented in view of this description. The method may be implemented in a computer program product.

The generation of a MIP, using the distance transform may comprise the following steps:

Detect the skin (or another object, depending on the application).

Generate a distance map (also called distance transform). Each voxel in the image is labeled with the distance to the nearest point of the skin (or the other object).

Part of the distance map or a combination of distance maps may be selected automatically or manually.

A weakening function is applied to the data that takes a distance map value as an input and produces a weakening factor as output; the voxel value is multiplied by this weakening factor.

It will be appreciated that the invention also applies to computer programs, particularly computer programs on or in a carrier, adapted to put the invention into practice. The program may be in the form of a source code, an object code, a code intermediate source and object code such as in a partially compiled form, or in any other form suitable for use in the implementation of the method according to the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise calls to each other. An embodiment relating to a computer program product comprises computer-executable instructions corresponding to each processing step of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any non-transitory entity or device capable of carrying the program. For example, the carrier may include a storage medium, such as a ROM, for example, a CD ROM or a semiconductor ROM, or a magnetic recording medium, for example, a magnetic hard disk. Alternatively, the carrier may be an integrated circuit in which the program is embedded, the integrated circuit being adapted to perform, or to be used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for generating a two-dimensional view of an image volume dataset, comprising:
   a distance computing subsystem for computing a distance from a feature detected in the image volume data set to an image element of the image volume dataset;
   a weighting subsystem for weighting an image element value of the image element, based on the distance, to obtain a weighted image element value; and
   a view generator for generating the two-dimensional view of the image volume dataset, based on the weighted image element value, wherein the two-dimensional view comprises a projection, and a pixel value of the view is based on the weighted image element value.

2. The system according to claim 1, wherein the detected feature comprises at least part of a border of an object represented by the image volume dataset.

3. The system according to claim 2, wherein the border comprises a border between a body and air.

4. The system according to claim 3, wherein the weighting subsystem is arranged for enhancing an image element located close to the skin and/or attenuating an image element located in a central portion of the body.

5. The system according to claim 4, wherein the distance computing subsystem is arranged for computing the distance from the border of the object to an image element inside the object.

6. The system according to claim 1, wherein the weighting subsystem is arranged for computing the weight according to a transfer function associating a weight with a distance.

7. The system according to claim 6, wherein the weighting subsystem is arranged for using a first transfer function for image elements on a first side of the detected feature, and a different second transfer function for image elements on a second side of the detected feature opposite the first side.

8. The system according to claim 1, wherein the view generator is arranged for generating a combined intensity projection, a maximum intensity projection, an average intensity projection, or a closest vessel projection of a volume comprising weighted image element values.

9. The system according to claim 1, wherein the view generator is arranged for evaluating a single value of any image element.

10. An image acquisition apparatus comprising the system according to claim 1.

11. A workstation comprising the system according to claim 1.

12. A method for generating a two-dimensional view of an image volume dataset, comprising:
   detecting a feature in the image volume dataset;
   computing a distance from the feature to an image element of the image volume dataset;
   weighting an image element value of the image element, based on the distance, to obtain a weighted image element value; and
   generating the two-dimensional view of the image volume dataset, based on the weighted image element value, the view comprising a projection wherein a pixel value of the view is based on the weighted image element value.

13. A non-transitory computer readable medium, including a program executable by a computer processor, for generating a two-dimensional view of an image volume dataset, the computer readable medium comprising:
   detecting code for detecting a feature in the image volume dataset;
   distance code for determining a distance from the feature to an image element of the image volume dataset;
   weighting code for weighting an image element value of the image element, based on the distance, to obtain a weighted image element value; and
   generating code for generating the two-dimensional view of the image volume dataset, based on the weighted image element value, the view comprising a projection wherein a pixel value of the view is based on the weighted image element value.

* * * * *